TELEPHONE ANSWERING AND RECORDING DEVICES

Filed Oct. 23, 1952 4 Sheets-Sheet 1

INVENTORS
H. R. Van Deventer
John J. Shively
BY
Van Deventer & Shively
ATTORNEYS Dec. 30, 1958 H. R. VAN DEVENTER ET AL 2,866,851
TELEPHONE ANSWERING AND RECORDING DEVICES
Filed Oct. 23, 1952 4 Sheets-Sheet 2

INVENTORS
H. R. Van Deventer
John J. Shively
BY Van Deventer & Shively
ATTORNEYS Dec. 30, 1958 H. R. VAN DEVENTER ET AL 2,866,851

TELEPHONE ANSWERING AND RECORDING DEVICES

Filed Oct. 23, 1952 4 Sheets-Sheet 3

INVENTORS
H. R. Van Deventer
John J. Shively
BY
Van Deventer & Shively
ATTORNEYS INVENTORS
H.R. Van Deventer
John J. Shively
BY
Van Deventer & Shively
ATTORNEYS United States Patent Office 2,866,851

Patented Dec. 30, 1958

2,866,851

TELEPHONE ANSWERING AND RECORDING DEVICES

Harry R. Van Deventer and John J. Shively, New York, N. Y., assignors to Telephone Answering and Recording Corporation, New York, N. Y., a corporation of Delaware Application October 23, 1952, Serial No. 316,476

6 Claims. (Cl. 179—6)

This invention relates to telephone answering and recording devices and has for its main object a reduction in the amount of apparatus and the simplification of the parts and circuits used therewith.

Another object is to provide improved control circuits for use in a device of the character described.

Other objects will be referred to or become obvious from a perusal of the following specification and drawings where one embodiment of the invention is disclosed by way of illustration.

Referring to the drawings.

Figure 1:
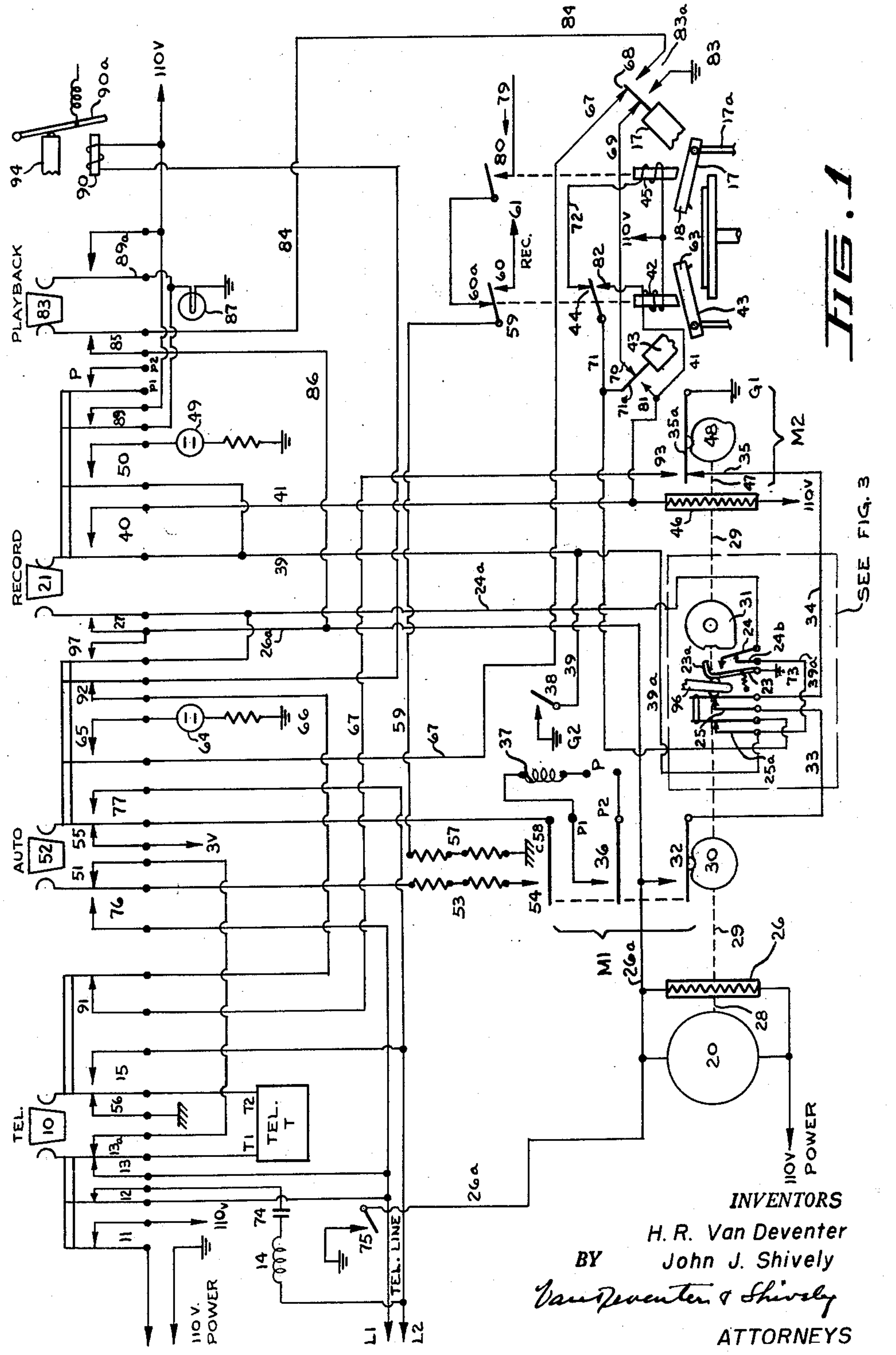
Figure 1 is a circuit diagram of the apparatus.
Figure 5:
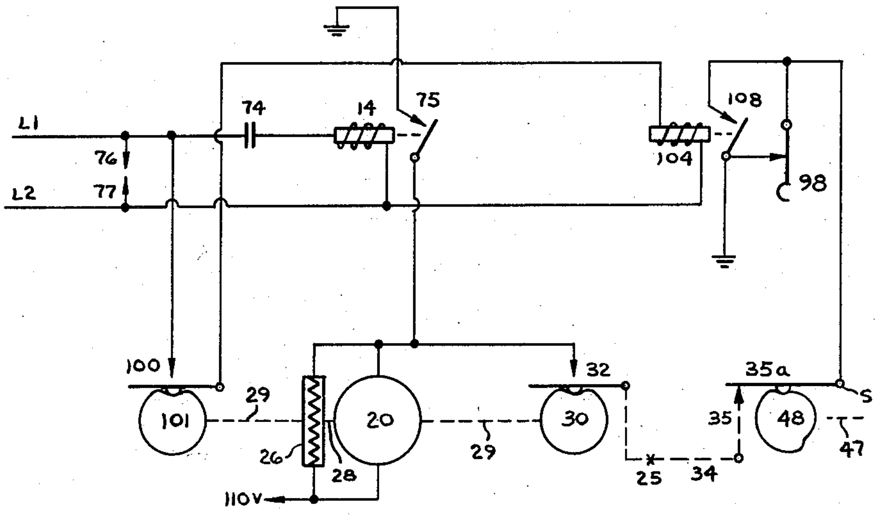
Figure 6:
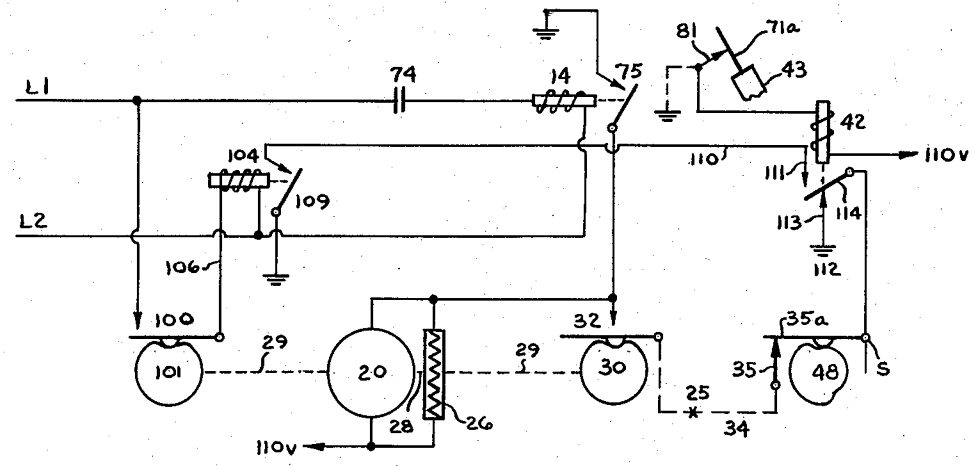
Figures 7, 8:
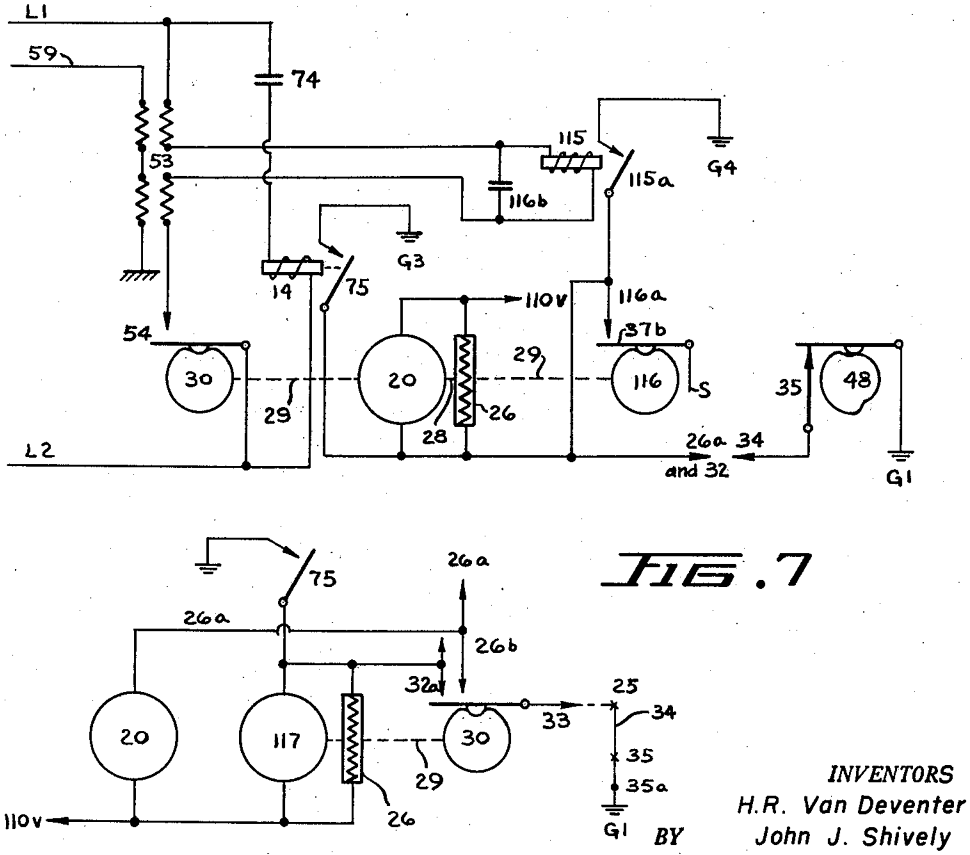

Figures 4 to 7, inclusive, show the circuits of alternate ways of connecting a control relay in the circuit of Figure 1; and Figure 8 is a modification of the circuit, Figure 1, showing a separate motor for the timing mechanism.

The invention will be described functionally, during which description, where necessary, any special features and constructions of the apparatus used will be pointed out. It will at once be apparent, however, that the construction of the parts and the arrangement of the circuits can be varied, without departing from the inventive concept as defined by the appended claims.

*Using the telephone instrument only*

Referring to Figure 1, when the key marked TEL, is depressed it locks down, as hereinafter described and controls the following circuits:

Contacts 11 open, opening the 110 v. power line to the apparatus which is therefore inoperative while this key is depressed. This power line is shown as grounded on the controlled side merely to save showing that side as a circuit wire throughout the drawings, and it will be understood the power circuit is wired metallic throughout.

Contacts 12 open, opening the circuit through the condenser 74 and ringing relay 14 which would otherwise be bridged across the incoming telephone line circuit L1, L2, which terminates in the telephone central office where it may be connected to other telephone lines.

Contacts 13 close, connecting the telephone instrument T to L1, and contacts 15 close connecting the remaining side of telephone instrument T to L2. The telephone instrument is now the only instrumentality connected to the line circuit L1, L2, and may be used in the usual manner for incoming and outgoing calls.

The telephone instrument T may be of any suitable kind and circuit, containing the usual transmitter, receiver ringer or bell, and hook switch. Usually such instruments have a handset containing the transmitter and receiver.

*Recording the talk-out message*

Figure 2:
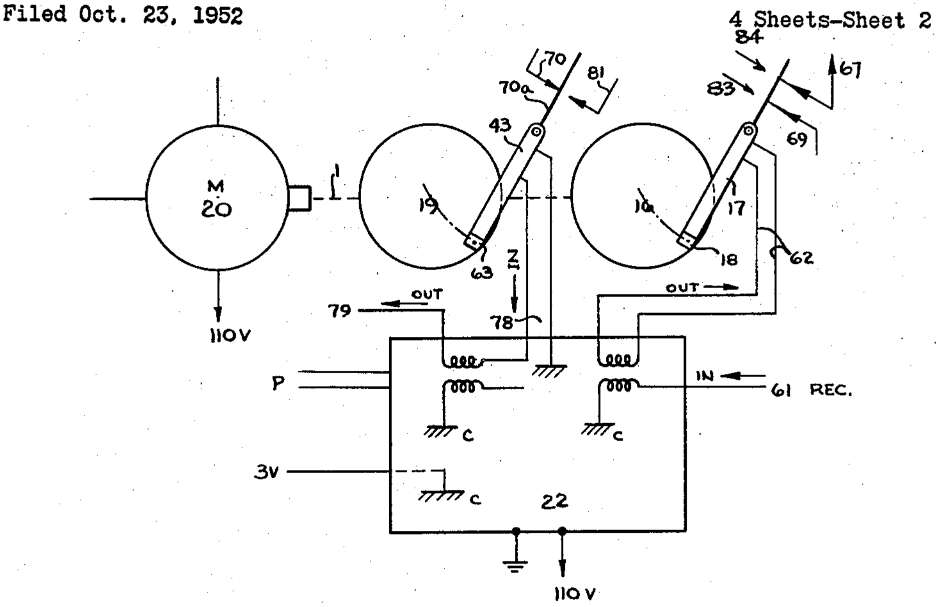
Figure 2 is a diagram of the amplifier, power supply and phonograph drive used with the circuits of Figure 1.

Referring to Figure 2, a blank record disc is placed on the turntable 16 below arm 17 carrying translator 18 to cut or emboss the record, or to record thereon in any other manner such as magnetically. Arm 17 is moved across the record in any suitable manner and may be driven by motor 20, via shaft **17*a*, (Figure 1), or by a separate motor operating during the recording period, as disclosed in the co-pending application Serial No. 133,506, filed December 17, 1949. It will be understood that the shaft 17*a* is moved whenever recording is done to cause translator 18 to traverse the record to record thereon in any desired manner. Said shaft 17*a*** is also moved whenever the record is being pre-grooved, as hereinafter described.

While in Figure 2, two turntables 16 and 19 are shown, both driven at the same speed by motor 20, it will be understood that a single turntable and with one or both records thereon may be used as shown in the co-pending application Serial No. 164,735, filed May 27, 1950.

The record blank being properly positioned, the user then depresses the Record key 21 which locks down, thereby releasing any other key that may be in locked position. This occurs with all the keys. However, it will be assumed that the key 10 has been down to use the telephone only and, therefore, there has been no current on the amplifier and power supply 22 (Figure 2), and the tubes therein are cold and not ready for operation when key 21 is depressed.

As soon as key 21 is depressed, a part of the timer mechanism M1 shown in Figure 3 and described in connection therewith is operated by the locking bar 94 of the key and contacts 23, 24, thereof are closed, and contacts **24*b*, 25, 25*a*** are opened.

Figure 3:
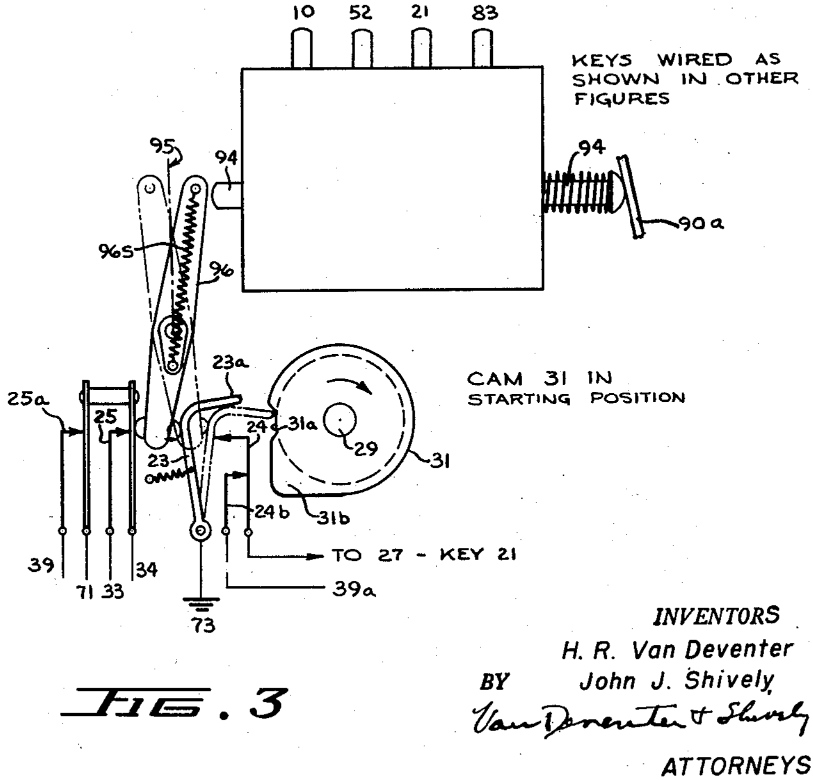
Figure 3 is a diagrammatic drawing of a timer mechanism used with the circuits and apparatus shown in Figure 1.

A power circuit can now be traced from the power supply through motor 20 and clutch 26 via conductor **26*a* to contacts 27 in key 21 and via conductor 24*a* to contacts 24 in the first timer M1, Figures 1 and 3. In Figure 1, the whole timer mechanism is designated by letter M1, plus that part shown in Figure 3. Contact 23 being grounded at 73, the motor 20 now operates and clutch 26, which is of the well known electrically operated automatically resetting type, clutches motor driving shaft 28 to driven timer shaft 29, suitable reduction gear (not shown) intervening, to drive shaft 29 at the desired speed—in this example 1 R. P. M. Shaft 29 moves cams 30 and 31 and the latter opens contacts 23, 24, after four seconds (or any other desired interval), then closing contacts 25 and 25*a* and 24 to 24*b***.

By this means, with a turntable speed of 15 R. P. M., a blank track, groove or embossing (sometimes hereinafter termed "pre-grooving") will be made at the beginning of the record for purposes hereinafter referred to in detail.

While cam 30 has operated contact 32, it has not completed a circuit through motor 20 and clutch 26, unless the plate circuit relay 37 has operated. The circuit through plate circuit relay 37 has been closed by contact P1 and P2 in key 21 but the pre-grooving may be completed before the tubes are warmed up and the motor will stop as back-contact **24*b* does not complete a power circuit until contacts 38 on relay 37** close.

However, as soon as relay 37 closes its contact 38, a power circuit is established from ground at G2 via a conductor 39 and **39*a* to contact 24*b* to contact 24, to conductor 24*a*, to contact 27, to conductor 26*a*, to the motor 20 and clutch 26** and the motor and clutch operate.

Cam 30 closes contact 32 and a circuit is now completed via conductor 33, contacts 25, conductor 34, and contacts 35 and 35a on timer M2 to ground at G1 to control the motor and clutch at M2.

Another power circuit is established from G2 via conductor 39, contacts 40 in key 21, conductor 41, grounds the combined arm lift magnet and relay 42 raising the talk-out arm 43 from the record. Contact 44 on this relay at this time also disables the recording arm lift magnet and relay 45 so that arm 17 with translator 18 resting on the record will not be moved.

It will be noted that when magnet 42 operates (contact 40 in key 21 being closed) that a second clutch 46 of the same description as clutch 26 operates, connecting the moving shaft 29 of the first timer M1 to shaft 47 of the second timer M2 carrying cam 48 which determines the length of recording, in this example, 30 seconds.

The magnets 42 and 45 are shown as lifting the arms 43 and 17 from the records when not needed for the talk-out or recording. By a simple re-arrangement of the circuits, the magnets can be made so as to lower or apply the respective arms to the records, the controls being reversed. For example, the magnet 45 may pull the arm 43 down toward the record for talk-out and play-back, and the magnet 42 may pull arm 17 down when recording. Such a reversal of the functioning of these magnets and the re-arrangement of the circuits and controls to effect same will be obvious to those skilled in the art, bearing in mind that these magnets are controlled in any event by plate relay 37 so that they will not operate until the amplifier is ready.

The user is warned when to begin speaking by the lamp 49 which will light (contacts 50 in key 21 being closed) only when plate relay 37 operates. The user records the message by merely lifting his handset and speaking into the transmitter of the telephone T, beginning when light 49 is first seen.

The talking circuits are as follows:

From the T1 side of the telephone T through the inner normally closed contacts 13a of key 10, to the inner contact 51 of key 52, through winding 53 of a repeating coil, via contact 54 on the timer M1 to normally closed contact 55 in key 52, to the 3 volt D. C. current supply in amplifier 22, to chassis ground C in the amplifier. T2 of the telephone is connected to chassis ground at normally closed contact 56 in key 10, thus completing the telephone circuit through one winding 53 of the repeating coil.

Winding 57 of the repeating coil is connected to the chassis ground at C58, and via conductor 59 to contact 60 on magnet 42 (magnet 42 being operated as previously referred to), and from 60 to conductor 61 to the recording input of amplifier 22, the recording output 62 thereof being connected to translator 18. Cam 48 being in motion, at the end of some predetermined period—say 30 seconds—will open contacts 35, 35a, and ground contact 93 operating release magnet 90 and restoring key 21 to normal, as more fully described hereinafter.

*Automatic answering and recording*

The talk-out message having having been made as just described, the record containing same is placed on turntable 19 and the talk-out or pick-up arm 43 carrying the reproducer 63 is properly poistioned at its starting point.

A record blank to record incoming messages is placed on table 16 and the recording arm 17 carrying the translator 18 is properly positioned at its starting point.

*Set-up signal on automatic*

It has been found that users sometimes fail to properly position the arms 17, 43, and press the key 52—in other words, fail to set-up the device for proper operation. To avoid this, the neon set-up lamp 64 is provided. When key 52 is depressed and locked down, contacts 65 close and establish a circuit from ground 66 through lamp 64 and via conductor 67 to contact 68, closed by arm 17 only when in its correct position to record on the record on table 16. The circuit continues from 68 via conductor 69 to the back contact 70 on a mid-cycle switch controlled by the talk-out arm 43 when in starting position on its associated record. Contact 70 is only closed when arm 43 is actually in position on the talk-out record on table 19. This signal circuit continues via contact 71a and conductor 71 to normally closed contact 44 on magnet 42 and via conductor 72 and the winding of magnet 45 to the 110 v. power supply. Thus lamp 64 will only light when key 52 is depressed and arms 17 and 43 are properly positioned. The amount of current required by lamp 64 is so small that it does not operate magnet 45.

It will be noted that arms 17 and 43 have two motions, the first vertically, caused by magnets 45, 42, which raise the respective arms from the records. The arms also move horizontally across the records, as shown by dotted lines, Figure 2. This movement operates switches 68, 83a, 70 and 81.

*Making starting groove automatic*

As soon as key 52 is depressed, timer mechanism shown in Figure 3 operates, as previously described, to operate motor 20 and clutch 26 for 4 seconds to make the starting groove or track at the beginning of the record. It will be noted that the circuit 71 to magnet 45 is open at contacts 25a while the record is being pre-grooved and this groove is only cut once regardless of how long the key 52 remains depressed, as the time mechanism (Figure 3) is reset after one operation and is not again operative unless a key is depressed.

*Answering cycle automatic*

The device having been properly set up as just described, upon receiving an incoming call, relay 14 in series with condenser 74 is operated by the incoming A. C. ringing current and closes its contacts 75, grounding motor 20 and clutch 26 which begin operation. This operates cam 30, closing contacts 32, 36 and 54. Contacts 32 via conductors 33, contacts 25 and conductor 34, now continues the ground connection from motor 20 and clutch 26 to contact 35 in timer M2, so that the motor operates continuously, controlled by contacts 32 and 35 once it is started by a pulse from the operation of the ringing relay contact 75.

Upon the closing of contacts 54, the winding 53 of the repeating coil is connected via contacts 76, 77, in the key 52, to the telephone line circuit L1, L2, and may act as a holding coil on C. B. systems.

As the 110 v. power supply has been connected to the amplifier 22, when key 52 was depressed (by release of key 10) the tubes in said amplifier are ready for operation as soon as contacts 36 in the timer closes and relay 37 in the P circuit operates, closing contacts 38 which, via conductors 39, 39a, contacts 25a and conductor 71 and contact 44, grounds magnet 45 lifting the arm 17 and translator 18 off the record as same are not needed at this part of the cycle.

The arm 43 carrying reproducer 63 is on the record and as 63 is connected to the amplifier input 78, and the associated output 79 is connected via contact 80 with conductor 59 via back contacts 60a on magnet 42 to winding 57 of the repeating coil, speech will be transmitted from the talk-out record to the calling party connected to L1, L2, as the winding 57 is in inductive relation to winding 53 which is connected across the telephone line.

*Recording cycle automatic*

Upon the completion of the delivery of the talk-out message, arm 43 reaches the point in its path of travel across the record, where it will close contact 81 on the mid-cycle switch. This puts a ground on clutch 46 (from ground at the plate relay contacts at 38 via conductors 39, 39a, contact 25, conductors 71, 71a, contact 81 to the clutch 46 and to 110 v.), and shafts 29 and 47 are coupled to operate cam 48 controlling contact 35.

When contact 81 closes, a circuit is established momentarily from ground via conductor 39, through contacts 25a, conductor 71, conductors 41, 42, to the 110 v. power, and arm 43 is lifted from the record as it is not now needed. Contact 82 is closed to hold magnet 42 and clutch 46 operated (as contact 81 controlled by arm 43 is only momentary). This arm being immediately reset to starting position by suitable mechanism similar to that shown in the co-pending application Serial No. 239,733 filed August 1, 1951, the arm 43 is reset to starting position as soon as it operates contact 81. When contact 82 is closed, contact 44 is opened, removing the ground from magnet 45 which lowers the recording arm 17, and translator 18 now contacts the record.

Magnet 45 also releases contact 80 and the circuit to the repeating coil winding 57 is re-established via conductor 59 and contact 60 to the input 61 of the amplifier 22, the associated output circuit 62 being connected to translator 18. Any message the calling party speaks will now be recorded.

Cam 48 has been operating meanwhile, and times the recording. It starts to move when the clutch 46 operates and recording starts, and may be set to open at any desired time—say 30 seconds, within the time that cam 30 permits.

Upon the opening of contact 35, ground G1 is removed from motor 20 and clutch 26, the motor stops, clutch 26 releases and contacts 32, 36 and 54 open.

When contacts 36 open, plate relay 37 opens its contacts 38 removing the ground from conductor 39, thereby releasing magnet 42, and all circuits are restored to normal and ready for the next call.

If key 52 remains depressed, no starting groove will be made upon reception of the next and preceding incoming calls, as it is necessary to release key 52 and again depress it to operate the pre-groove making apparatus and circuits shown in Figure 3. However, all succeeding incoming calls will be received, answered and the incoming messages recorded as just described.

*Playing back recorded messages*

The user must test the talk-out message after recording same to see if it is correct. Also the messages left by calling parties must be played back. This is accomplished as follows:

Key 83 marked "Playback" is depressed and locks down. Arm 17 is manually moved off the record and closes contacts 83a. This grounds conductor 84, and the circuit is from ground at 83, conductor 84, contacts 85 in key 83, conductor 86 to conductor 26a to motor 20 and clutch 26. These now operate as previously described for the "Talk-Out Cycle Automatic," the arm 43 and pick-up 63 being used to reproduce messages from records on either table 16 or 19, said message being heard in the receiver of the telephone T, the talking circuits being the same as previously described.

It will be noted that arm 43 may be manually moved without operating contact 81 adjacent the talk-out arm 43, consequently relay 42 is not operated, and the device stays on talk-out cycle and—because the ground at 83 via contacts 85, 83a, is permanent until the key 83 is restored, or arm 17 is moved—the playback may continue as long as desired.

*Signal and control circuits*

The function of set-up lamp 64 has been described under the heading "Set-Up Signal on Automatic."

The function of the Talk signal lamp 49 has been briefly referred to under the heading "Recording the Talk-Out Message," but it may be noted that the provision of this signal prevents the user from starting to talk when the motor 20 starts, as recording until the amplifier tubes have warmed up is impossible. The lamp 49 will not light until the tubes are warm because the plate circuit relay 37 which controls lamp 49 does not close until the current is sufficient for recording.

In order that the user will not leave the device with keys 21 or 83 locked down, a signal lamp 87 is provided connected in the power circuit via contacts 89, 89a, in keys 21 and 83 and will light when these keys are depressed, warning the user not to leave the instrument without restoring these keys, which may be done by pressing key 10, or by pressing the usual release button commonly provided with these interlocking keys.

As previously pointed out, the Record key 21 may be automatically released by providing a magnet 90 connected in series with the 110 v. power supply and contacts 91, 92 (which open when keys 10 or 52 are depressed as magnet 90 should not operate to release these keys). At the end of the recording period, contact 93 is momentarily grounded by the operation of cam 48, and magnet 90 attracts the spring retracted armature 90a to move the locking and release bar 94, which will release key 21.

*Advantages of the starting groove (pre-grooving)*

It is advantageous to run the turntable 16 for recording at 15 R. P. M. so as to get about 150—30 second incoming messages on an 8 inch disc. This means 1 revolution per minute.

Now when the talk-out message is made—if the recording started as soon as the disc started to turn, the first 4 seconds recording would be in the first groove. As the point where the needle or other pick-up element of reproducer 64 enters the groove cannot be determined, some of this recording would be lost in many cases as there is no way to stop the table 19 at a different point to insure the needle will start at the beginning of the groove. This difficulty is avoided by this invention where a starting groove is first made, before the recording of the message begins. With this arrangement, regardless of where the needle engages the first groove, it will always pick-up all of the recorded message which only begins in the second groove.

While this may insure a delay of from 1 to 4 seconds as the device shifts from talk-out to record-in, this delay is not objectionable, as it permits time for the tone-signal required by the Federal Communications Commission to be impressed on the telephone line to warn the calling party that his message is being recorded. The application of this signal is not shown herein, but is described in the co-pending application Serial No. 280,046, filed April 2, 1952, and may be easily applied to the present invention.

*Description of apparatus, Figure 2*

The motor 20 is of any suitable type. Usually such motors run at 1625 R. P. M. and by suitable reduction gearing rotate tables 16, 19, at the desired speed—in this case at 15 R. P. M. Heretofore it has been customary to operate said tables by separate motors. One motor is eliminated by the present invention.

The amplifier and power supply 22 is of any desired type, and, therefore, the circuits of same are not shown in detail.

It will be noted that a 3 volt D. C. current is taken off the power supply and connected to contacts 55 in key 52 to normally supply current for the operation of the telephone transmitter in the telephone T for local recording. Of course, a magnetic or crystal microphone could be used. The amplifier power supply is of course connected through contacts 11 in the key 10 so that when the telephone T only is in use, the amplifier is disconnected. At all other times the amplifier tubes are connected to the power circuit, but the plate circuit thereof is not closed.

*Description of Figure 3 mechanism for pre-grooving records*

Locking bar 94 is shown in its normal position. When any key is depressed, the end of this bar advances to point 95, and then retracts to the position shown in solid lines. This action moves the lever 96 over centre. It is held in either position by spring 96S.

When moved to the position shown in dotted lines, contact 23 permanently grounded at 73 rests with its end **23*a* against the depressed surface 31*a* of cam 31 and closes to contact 24 opening contact 24*b*. This also opens normally closed contacts 25, 25*a*. When cam 31 revolves, 23*a* remains in said depression 31*a* for approximately 4 seconds, maintaining a ground on contact 24 for this period. The cam surface 31*b* restores lever 96 to its normal position against bar 94. The spring 96S** carries the lever over centre.

It will be noted that when lever 96 is moved toward the cam 31, that contacts 25, **25*a*, are opened, and that these contacts are closed when the lever 96 is in normal position. Also contacts 23, 24, break before 24, 24*b*, make. Obviously, the lever 96 is only operated once upon the operation of any key. However, while key 10 will operate the lever, it will not operate to cut a starting groove as the control circuit 24*a* to contact 24, is open at contact 27 of key 21 and contact 97 of key 52**.

A groove will be cut when "Record" key 21 is depressed, because the control circuit **24*a* is connected at 27 to motor circuit 26*a* connected to motor 20 and clutch 26. A groove will be cut when key 52 is depressed, because circuit 24*a* is closed to motor circuit 26*a* at contacts 97 in this key. No starting groove will be cut when key 83 is depressed as the control circuit is open at 27 and 97**, as aforesaid.

Multiple button keys with locking bars 94 as just described, are old in the art, the new feature here claimed being the use of the lever 96 and resetting cam 31 in combination and operating with a timer as described.

*Telephone line never left open at the apparatus*

It will be noted that at no time is the telephone line L1, L2, disconnected from a signalling device. When key 10 is depressed the bell or ringer in the telephone T is connected to the line; with any other button depressed, relay 14 is across the line to act as an audible signal should a call come in while keys 21 or 83 are in use.

If key 52 is depressed, the relay 14 is also ready to operate to start the device on its automatic cycle.

*Arrangement of amplifier input and output circuits to prevent coupling*

It will be observed that amplifier 22 has two independent circuits—one for recording 61, 62 and another 78, 79, for talk-out and playback. These circuits must be kept separate as far as possible to avoid interference and capacity coupling.

Heretofore when shifting from output 79 (talk-out) to input 61 (recording), it has been necessary to bring these circuits together to the contact springs of a relay and special anti-capacity springs have been necessary and are relatively expensive. Other arrangements employed two relays whose only function was to keep these circuits separated. The present invention overcomes these difficulties by using the lift magnets 42, 45, to switch the amplifier circuits. Relay 45 which is operated during talk-out or "Playback," controls contact 80 to output 79 from reproducer 63; relay 42 which is operated during "Record" operates contacts 60 to input 61 to translator 18.

Thus the live springs 60, 80, on magnets 42, 45, are widely separated and no coupling between these amplifier circuits can occur. The use of anti-capacity spring arrangements is eliminated; these are some of the advantages and objects of this arrangement.

It will be noted that when the device is set for automatic (key 50) operation, that the length of the talk-out cycle is fixed by the operation of the mid-cycle switch **71*a*, 81, and that after the operation of this switch as described, the device operates to record for a period—say 30 seconds—fixed by the operation of cam 48 as previously described. However, it is possible when the device is used with some common battery systems to provide means whereby—upon the hanging up of the calling telephone at the termination of a recording—the device may be stopped before cam 48 operates to open contact 35**. This is possible because on some common battery systems when a calling line is connected to a called line—the answering device being connected to the latter—upon the calling party hanging up the receiver, a change in the state of current flow takes place in the called line.

This is brought about, for example, where the operator at a manual exchange disconnects the plug to the called line, thereby causing a momentary break or interruption of the current flowing in said line. This break also occurs in some automatic systems.

Another change that may occur in some systems is a reversal in polarity in the current flowing in the called line when the calling party hangs up his receiver. In this case the control relays hereinafter referred to are of the polarized type and operate upon a reversal of the line current. The operation of such relays is the same as the relays to be presently described, which operate upon a break in the line circuit.

Also, the control relays may be of the marginal type designed to operate by means of variations in the strength of current flowing in the telephone line circuit, said variation or change of state occurring in the called line to which the device is connected, when the calling party hangs up his receiver.

It will be observed that the exact type of relay depends upon the characteristics of the central office equipment used, and—once the inventive concept herein disclosed is known—the selection of a suitable known relay is merely a matter of engineering choice.

Figure 4:
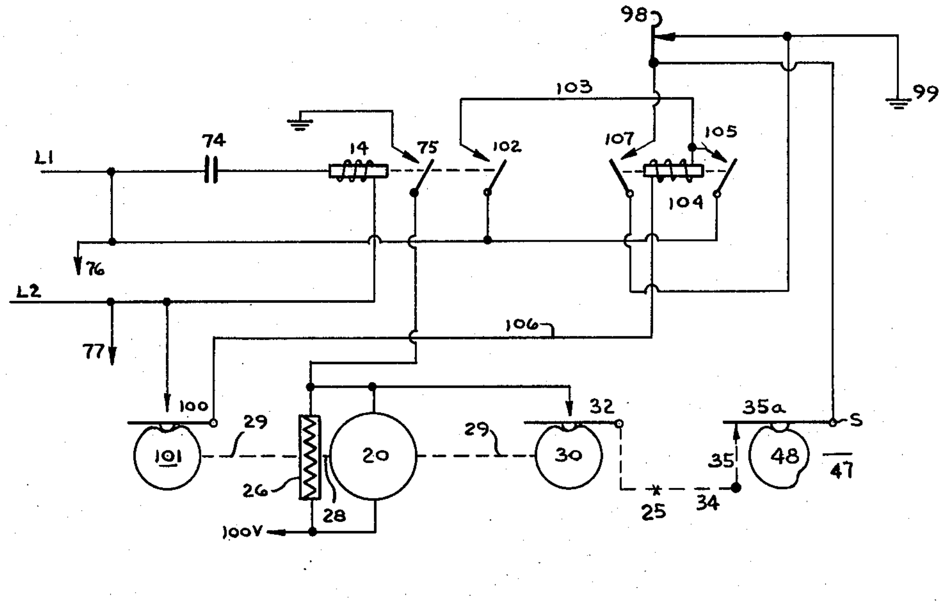

Referring to Figures 1 and 4, the latter shows one circuit arrangement that can be used with control relays to effect the operation just described. In Figure 4, the numeral 98 denotes an extra pair of normally closed contacts in key 52 which open when said key is depressed. Normally the ground connection 99 is connected through contacts 98 to the contact **35*a* operated by cam 48** and the operation of the device is in all respects the same as described in connection with Figure 1.

However, when the circuit Figure 4 is used, upon the operation of ringing relay 14, the ringing circuit operates as described in connection with Figure 1. Motor 20 and clutch 26 operate to close contacts 100 by means of cam 101. These contacts 100 may be operated by cam 30 instead of cam 101 on shaft 29, if desired. Upon the closing of contacts 100 and co-incident therewith contacts 102 on relay 14 close momentarily, establishing a circuit via conductor 103, from line conduit L1 through the winding of control relay 104 and via contact 105 and conductor 106 through timer contacts 100 to line circuit L2.

When relay 104 closes its contacts 105 because of D. C. current flowing in L1, L2, the line circuit L1, L2, is completed through its winding independent of the intermittently operating contacts 102 of the ringing relay 14, and relay 104 is now connected across the telephone line circuit and is held closed by the current flowing therein from the central office battery.

When relay 104 operates, it closes contacts 107, and key contacts 98 being open, timer contact **35*a* gets its ground from 99 via contacts 107 on relay 105**.

Should there be no change in the state of the current flowing in the telephone line circuit, the device will operate as described in connection with Figure 1, and when contact is broken at 35 on the timer, as previously described, motor 20 will stop and timer cams 30, 101, reset to normal, contacts 100 opening the circuit to relay 105 which releases its contacts and the device is ready for the next call.

However, should there be a change of state in the current flowing in the telephone line circuit before the timer contacts 35, 35*a*, operate, relay 104 will release its contacts thereby opening the ground circuit from 99 at 107 and stopping motor 20—all contacts being restored to normal condition awaiting the next call.

It will now be evident that the calling party can determine the length of the recorded message within the limit set by cam 48. For example, he can record for 10 seconds and then hang up his receiver and the device will stop. This results in saving recording space on the record blanks used on table 16 and also reduces the time the telephone line is tied up. Without relay 104, if a calling party only talked 10 seconds, timer cam 48 and the mechanism controlled thereby would continue to hold the line for an additional 20 seconds, during which time the line would test "busy" to any incoming calls. This is prevented by the use of the control relay 104.

Figure 5 discloses an alternate method of using relay 104 but eliminating contacts 102 and 105, Figure 4. In Figure 5, as soon as motor 20 starts by reason of the closing of contacts 75 on the ringing relay 14 as previously described, timer contacts 100 close as previously described, placing the winding of relay 104 across the telephone line as previously described. The contacts in key 98 being open, the ground circuit from 99 to contacts 35, 35*a*, is controlled by contacts 108 on relay 104 and relay 104 controls the length of recording as described in connection with Figure 4.

It will be noted in connection with Figures 4 and 5, that if relay 104 operates during the talk-out cycle, that it will stop the device, same as occurs during the recording cycle. This is useful in some cases where the calling party hears the beginning of the talk-out message—and knowing there is no one at the telephone and not wishing to leave a message—hangs up his receiver. Without relay 104 the device would operate until the entire talk-out message was delivered, thereby tying up the line which would test "busy" during this time to all incoming calls. Should it be desired to have relay 104 function during the recording cycle only, the circuits shown in Figure 6 may be used.

In Figure 6, the operation of cam 101 to close the line circuit through the winding of relay 104 is as previously described. Relay 104 closes contacts 109 to complete a circuit via conductor 110 to the normally open contact 111 on relay magnet 42 which—as described in connection with Figure 1—operates during the recording cycle.

Motor 20 and timer 32, 30, continue to operate during the talk-out cycle via ground at 112, contact 113 and contact 114, said last contacts being normally closed during the talk-out cycle.

When recording starts, as previously described in connection with Figure 1, relay 42 is energized via the mid-cycle switch 71*a*, 81, and remains energized during the recording cycle, as previously described.

When relay 42 operates, the contacts 111 and 114 close and now the circuit to timer contacts 35, 35*a*, is controlled thereby, the timer now being grounded at 109 on relay 104.

If now relay 104 releases its contacts before timer cam 48 opens its contacts, the ground at 109 will be removed from the timer circuit, the timer returns to normal and the device resets, awaiting the next call.

Figure 7 shows an alternate form of circuit where the control relay 115 has a comparatively low resistance—say 50 ohms—and is placed in series with L1, L2, and contact 54—preferably in the center of the repeating coil windings 53. Relay 115 has a condenser 116*b* in parallel therewith.

A first control circuit can be traced from L1 through condenser 74, the winding of relay 14 to L2.

When A. C. ringing current is impressed on L1, L2, relay 14 momentarily closes its contacts 75, establishing a second control circuit serially from G3 including contacts 75, the motor 20, clutch 26 and the 110 v. power supply.

Motor 20 operating cam 30 closes contact 54 in the timer mechanism and a circuit is established which serially includes L1, L2, the windings 53 of the repeating coil and the winding of the control relay 115, the contacts 115*a* of which when closed complete a third control circuit serially including G4, contacts 115*a*, the motor 20, clutch 26, and the 110 v. power supply.

Should relay 115 open its contacts 115*a*—due to interruption or change of state of the current flowing in L1, L2—clutch 26 operates to reset the timer as previously described and contacts 54 open, restoring all circuits to normal.

If the device remains in operation for the full period permitted by the timer, when contacts 54 open, the control circuits are opened and the device resets to normal, as previously described.

The cam 116 and contact 116*a* are provided in the timer operated by shaft 29 in case it is desired to use the device on a magneto line circuit, and the device will operate independently of relay 115 until the ground at S is removed from contact 37*b* when the exchange is cut over to common battery operation.

The device can be wired as shown in any of the figures and converted in the field when it is desired to use them on magneto lines where there is no sustaining current to operate control relay by merely grounding the contacts 35*a*, Figures 4, 5, 6 and 7 at S. This obviates the necessity of having two devices—one for common battery, the other for magneto service—and it is easy to convert the instrument from magneto to common battery service when the magneto exchange is cut-over to C. B. as often occurs.

Referring to Figure 8, a separate timer motor 117 may be used to operate the timer shaft 29, instead of motor 20 as shown in the preceding figures. Timer motor 117 is wired across clutch 26 and to the power circuit; via contact 32*a*. Motor 20 is connected to the power circuit by an additional contact 26*b* in the timer. The operation is the same as described in connection with Figure 1 except that the timer 117 places less load on contacts 75 of starting relay 14, and the small timer motor is quick-starting.

This arrangement can be used with any of the circuits Figures 1 and 4 to 7 inclusive.

It will be noted that Figures 4 to 8, inclusive, only show sufficient parts of the circuits shown in Figure 1 to a proper understanding of the operation of the control relays 104 and 115 and timer 117. All other circuits shown in these figures are as shown in Figure 1.

What is claimed is:

1. Control circuits and apparatus in combination therewith for use in a device of the character described; a motor having a shaft; a first timing mechanism having contacts and a shaft; a first electrically operated automatically resetting clutch interposed between said shafts and adapted when energized to couple said motor shaft to said first timer shaft to operate said first timer mechanism; a first power supply circuit, one side of which is connected to said motor and clutch; a first contact means including some of said first mentioned contacts controlled by said first timer for connecting the remaining controlled side of said first power circuit to said motor and first clutch, thereby completing said power circuit thereto, said means being operable for a predetermined period to control said first timing mechanism; a second power supply circuit; a second contact means; a relay in said second power supply circuit in series with said second contact means whereby said relay will be energized upon the operation of said second contact means, said relay having normally open contacts; a second timing mechanism having contacts and a shaft, a second electrically operated automatically resetting clutch interposed between the said shafts of said timing mechanisms; a third contact means including some of said contacts of said second timer mechanism serially included in a circuit with said first contact means in said first timer adapted to disable said first power circuit to disconnect said motor and first clutch therefrom, said second timer and second clutch being released upon operation of said second control means upon the operation of said first timer.

2. The combination as claimed in claim 1, including a fourth contact means comprising some of said contacts in said first timer; a repeating coil winding; a speech circuit serially including said fourth contact means, said transmitter and said repeating coil winding whereby said speech circuit is completed and disabled upon the closing and opening of said fourth contact means when operated by said first timer, a second winding on said repeating coil; an amplifier having input and output circuits; a phonograph having a translator connected to said output circuit; a second speech circuit serially including said second winding of said repeating coil; and means operable upon the closing of said relay in said second power circuit for connecting said second speech circuit to said input circuit while said relay is energized, whereby speech spoken into said transmitter may be recorded on a recording medium in said phonograph.

3. Control circuits and apparatus in combination therewith for use in a device of the character described; a motor having a shaft, a timing mechanism having contacts and a shaft; an electrically operated automatically resetting clutch interposed between said shafts and adapted while energized to couple said shafts to operate said timer mechanism; a first power supply circuit, one side of which is connected to said motor and clutch; a first contact means comprising some of said first-mentioned contacts controlled by said timer for connecting the remaining controlled side of said first power circuit to said motor and clutch; a relay in said second power supply circuit in series with said second contact means whereby said relay will be energized upon the operation of said second contact means, said relay having normally open contacts; a third contact means comprising some of said contacts in said timer; a receiver; a repeating coil winding; a speech circuit serially including said third contact means, said receiver and said repeating coil winding whereby said speech circuit is completed and disabled upon the closing and opening of said third contact means when same is operated by said timer; a second winding on said repeating coil; an amplifier having input and output circuits; a phonograph having a reproducer and a record containing a sound recording thereon connected to said output circuit; and a second speech circuit serially including said second winding of said repeating coil and said input circuit of said amplifier.

4. Control circuits and apparatus in combination therewith for use in a device of the character described; a motor having a shaft; a first timing mechanism having contacts and a shaft; a first electrically operated automatically resetting clutch interposed between said shafts and adapted when energized to couple said motor shaft to said first timer shaft to operate said first timer mechanism; a first power supply circuit, one side of which is connected to said motor and clutch; a first contact means including some of said first-mentioned contacts controlled by said first timer for connecting the remaining controlled side of said first power circuit to said motor and first clutch, thereby completing said power circuit thereto, said means being operable for a predetermined period to control said first timing mechanism; a second power supply circuit; a second contact means; a relay in said second power supply circuit in series with said second contact means whereby said relay will be energized upon the operation of said second contact means, said relay having normally open contacts; a second timing mechanism having contacts and a shaft, a second electrically operated automatically resetting clutch interposed between the said shafts of said timing mechanisms; a third contact means including some of said contacts of said second timer mechanism serially included in a circuit with said first contact means in said first timer adapted to disable said first power circuit to disconnect said motor and first clutch therefrom, said second timer and second clutch being released upon operation of said second control means upon the operation of said first timer; a telephone line circuit having a relay connected thereto and operable by ringing current flowing in said circuit, said relay having a normally open contact; a starting circuit between said last contact and said controlled side of said first power supply circuit, whereby upon the closing of said last contact, the said first power supply circuit is completed through said motor and first clutch to start the operation of the device.

5. Control circuits and apparatus in combination therewith for use in a device of the character described; a motor having a shaft; a first timing mechanism having contacts and a shaft; a first electrically operated automatically resetting clutch interposed between said shafts and adapted when energized to couple said motor shaft to said first timer shaft to operate said first timer mechanism; a first power supply circuit, one side of which is connected to said motor and clutch; a first contact means including some of said first-mentioned contacts controlled by said first timer for connecting the remaining controlled side of said first power circuit to said motor and first clutch, thereby completing said power circuit thereto, said means being operable for a predetermined period to control said first timing mechanism; a second power supply circuit; a second contact means; a relay in said second power supply circuit in series with said second contact means whereby said relay will be energized upon the operation of said second contact means, said relay having normally open contacts; a second timing mechanism having contacts and a shaft, a second electrically operated automatically resetting clutch interposed between the said shafts of said timing mechanisms; a third contact means including some of said contacts of said second timer mechanism serially included in a circuit with said first contact means in said first timer adapted to disable said first power circuit to disconnect said motor and first clutch therefrom, said second timer and second clutch being released upon operation of said second control means upon the operation of said first timer; a telephone line circuit having a relay connected thereto and operable by ringing current flowing in said circuit, said relay having a normally open contact; a starting circuit beftween said last contact and said controlled side of said first power supply circuit, whereby upon the closing of said last contact, the said first power supply circuit is completed through said motor and first clutch to start the operation of the device; a fourth contact means comprising some of said contacts in said first timer; a repeating coil winding; a speech circuit serially including said winding, said telephone line circuit and said fourth contact means; a second winding on said repeating coil; an amplifier having talk-out input and output circuits; a phonograph having a reproducer and a record containing a sound recording thereon connected to said input circuit; and a second speech circuit serially including said second winding of said repeating coil and said output circuit of said amplifier.

6. Control circuits and apparatus in combination therewith for use in a device of the character described; a motor having a shaft; a first timing mechanism having contacts and a shaft; a first electrically operated automatically resetting clutch interposed between said shafts and adapted when energized to couple said motor shaft to said first timer shaft to operate said first timer mechanism; a first power supply circuit, one side of which is connected to said motor and clutch; a first contact means including some of said first-mentioned contacts controlled by said first timer for connecting the remaining controlled side of said first power circuit to said motor and first clutch, thereby completing said power circuit thereto, said means being operable for a predetermined period to control said first timing mechanism; a second power supply circuit; a second contact means; a relay in said second power supply circuit in series with said second contact means whereby said relay will be energized upon the operation of said second contact means, said relay having normally open contacts; a second timing mechanism having contacts and a shaft, a second electrically operated automatically resetting clutch interposed between the said shafts of said timing mechanisms; a third contact means including some of said contacts of said second timer mechanism serially included in a circuit with said first contact means in said first timer adapted to disable said first power circuit to disconnect said motor and first clutch therefrom, said second timer and second clutch being released upon operation of said second control means upon the operation of said first timer; a telephone line circuit having a relay connected thereto and operable by ringing current flowing in said circuit, said relay having a normally open contact; a starting circuit between said last contact and said controlled side of said first power supply circuit, whereby upon the closing of said last contact, the said first power supply circuit is completed through said motor and first clutch to start the operation of the device; a fourth contact means comprising some of said contacts in said first timer; a repeating coil winding; a speech circuit serially including said winding, said telephone line circuit and said fourth contact means; a second winding on said repeating coil; an amplifier having talk-out input and output circuits; a phonograph having a reproducer and a record containing a sound recording thereon connected to said input circuit; a second speech circuit serially including said second winding of said repeating coil and said output circuit of said amplifier; a switch having contacts adapted to be closed when said reproducer reaches the end of said sound recording on said record; a relay; a power circuit serially including said relay and said last contacts for disabling said reproducer; means controlled by said last relay to switch said second speech circuit to the recording input circuit of said amplifier; a recording output circuit in said amplifier; a recording phonograph having its translator connected to said recording output circuit whereby speech incoming over said telephone line circuit and the first-mentioned winding of said repeating coil may be recorded by said last phonograph via said second winding of said repeating coil and via said recording input and output to said translator.

References Cited in the file of this patent

UNITED STATES PATENTS

| | | |
|---|---|---|
| 2,374,842 | Shively et al. | May 1, 1945 |
| 2,375,525 | Clausen | May 8, 1945 |
| 2,391,897 | Harrington | Jan. 1, 1946 |
| 2,519,568 | Handschin | Aug. 22, 1950 |
| 2,537,407 | Handschin et al. | Jan. 9, 1951 |
| 2,709,202 | Handschin | May 24, 1955 |
| 2,793,250 | Van Deventer et al. | May 21, 1957 |